May 23, 1967     D. L. MORGAN     3,320,965

FREEZE PROTECTION DUMP VALVE

Filed May 18, 1964

INVENTOR
DAVID LUKE MORGAN

BY

*Birch & O'Brien*

ATTORNEYS

United States Patent Office 3,320,965
Patented May 23, 1967

3,320,965
FREEZE PROTECTION DUMP VALVE
David L. Morgan, Shelton, Conn., assignor to Robertshaw Controls Company, Richmond, Va., a corporation of Delaware
Filed May 18, 1964, Ser. No. 367,990
5 Claims. (Cl. 137—62)

The present invention relates to dump valves and in particular to a dump valve that drains a fluid line when the combination of temperature and pressure conditions is such as to result in a dangerous condition that may damage the line.

It is conventional practice to provide a fluid line with a drain valve that will open at a predetermined temperature in order to avoid damage to the line as would result from the freezing of fluid in the line.

However, none of the conventional freeze protection devices includes the feature of operation on a combined temperature and pressure response.

It is, therefore, an object of the present invention to operate the freeze protection device of a fluid line in accordance with a combined temperature and pressure response.

Another object of the present invention is to prevent draining of a fluid line whenever the line pressure is above a predetermined value.

The present invention has another object in that a temperature responsive means effects draining of a fluid line only when line pressure is below a predetermined value.

A further object of the present invention is to assure draining of a fluid line when line pressure is below a predetermined value and when the thermally responsive means has failed.

In practicing the present invention, a preferred embodiment includes a valve body having a chamber adapted to be in communication with the fluid in a line, drain valve means in the valve body to drain the fluid in the line, temperature responsive means operatively connected to the valve means for moving the same to an open position in response to a predetermined temperature condition, and means on the valve means responding to line pressure for maintaining the same in a closed position.

Additional features and advantages of the present invention will become apparent from the following description of the preferred embodiment, taken in connection with the accompanying drawing wherein.

Figure 1:
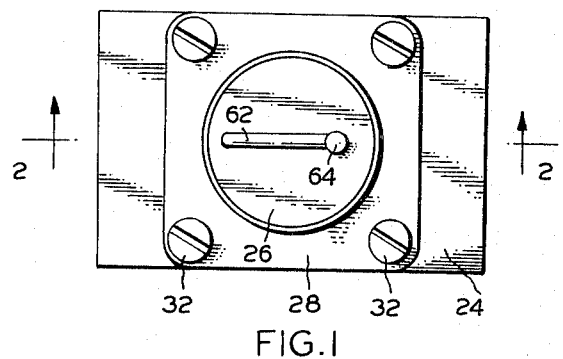
FIGURE 1 is a plan view of a valve body embodying the present invention.
Figure 2:
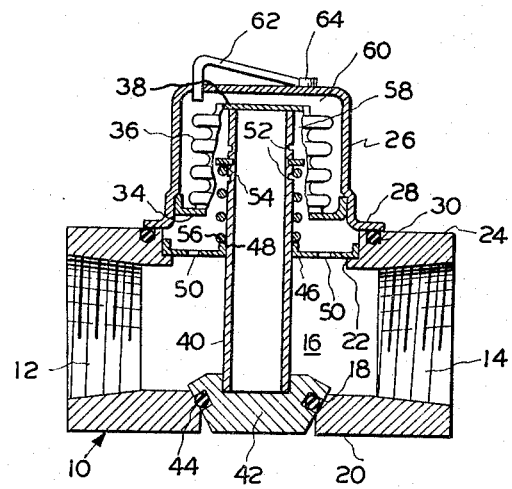
FIGURE 2 is a cross section taken along line 2—2 of FIGURE 1.

As is illustrated in FIGURES 1 and 2 of the drawing, a preferred embodiment of the present invention includes a valve body 10 having an inlet 12 and an outlet 14 interconnected by a through bore defining a valve chamber 16. The chamber 16 has two additional openings, the lower opening defined by a valve seat 18 in the bottom wall 20 of the valve body 10 and the upper opening defined by annular shoulder 22 in the top wall 24 thereof.

The upper opening in the top wall of valve body 10 is covered by an inverted, generally cup-shaped housing 26 which has a rim flange 28. An O-ring seal 30 disposed in a recess in the outer top wall 24 seals the upper opening and is covered by the rim flange 28 which is secured to the top wall 24 by suitable fastening means, such as the four bolts 32. The interior of the bellows housing 26 has an annular support 34 secured to its inner lower wall as by welding. A contracting and expanding bellows 36 has its lower end integrally attached to the support 34 and has its upper end integrally formed with an end plate 38.

A valve stem 40 formed by a rod like or tubular element carries a tapered valve member 42 on its lower end; a recess in the tapered surface of valve 42 houses an O-ring seal 44 that provides effective sealing for the lower opening when the valve member 42 engages the valve seat or drain port 18. The valve stem extends into the interior of the bellows 36 to engage the undersurface of the bellows end plate 38. An annular washer 46, fixedly supported by the annular shoulder 22 as by a press fit, has an inner annular collar 48 which guides the movement of the valve stem 40. A plurality of apertures 50 radially spaced about the washer 46 establishes communication between the valve chamber 16 and the interior of the bellows 36.

Adjacent its upper end, the exterior of the valve stem 40 has a plurality (three) of circumferential grooves 52 longitudinally spaced to define adjustment notches for selectively receiving a snap ring 54. A coil spring 56 encircles a portion of the valve stem 40 and is mounted in compression between the snap ring 54 and the spring retainer washer 46. The spring biasing force exerted on the valve stem 40 and valve member 42 may be pre-adjusted to particular installation conditions by selective positioning of the snap ring 54 in one of the grooves 52.

Inasmuch as the bellows 36 is sealed in opposite directions on its opposite ends, the bellows defines a movable wall between two chambers; an interior bellows chamber 58 communicating with the valve chamber 16 and an exterior bellows chamber 60 that is enclosed by the housing 26. With such an arrangement the interior of the bellows is subject to the conditions of line fluid in the chamber 58; the exterior of the bellows is subject to the conditions of a temperature responsive fluid in the chamber 60, which fluid may be selected for particular installations. In the present arrangement, the chamber 60 is filled with sulphur dioxide by means of a filling tube 62 on the top of housing 26, which after the filling operation is sealed and welded as at 64 to the top of housing 26. The sulphur dioxide is so charged in the above embodiment as to "break" at approximately 60° F., i.e., below 60° F. the chamber 60 will include saturated vapor and liquid, while above 60° F. only superheated vapor is present in the chamber 60. The use of the sulphur dioxide fill and the specific material and design of the bellows assembly results in a combined temperature and pressure responsive dump valve that will withstand a maximum temperature of 350° F. and a maximum pressure of 125 p.s.i.

The utility and unusual characteristics of the present invention will become more apparent from the following description of a sequence of operation of the above preferred embodiment. The dump valve assembly may be utilized on a fluid line to drain the fluid when the combination of temperature and pressure conditions is such as to cause a dangerous situation, such as freezing. As shown in FIGURE 2, the dump valve assembly would be in the fluid line; however, by closing either end opening 12 and 14, the assembly could be installed in a T connector off the line. Other line arrangements are permissible so long as the valve chamber 16 communicates in some fashion with the fluid flow in the line and thus cause the bellows chamber 58 to be correlated to line pressure.

FIGURE 2 illustrates the operating position of the valve assembly when the line pressure exceeds 10 p.s.i., i.e., the valve member 42 is closed. By design, the effective area of the valve is equal to that of the bellows. The valve member 42 will remain closed as long as the line pressure exceeds 10 p.s.i. regardless of temperature because the biasing force of the coil spring 56 is not sufficient to overcome the pressure force holding the valve member 42 on the valve seat 18. However, excessive line pressure transmitted to the bellows chamber 58 causes the bellows 36 to expand and since the end plate 38 is not fastened to the valve stem 40, the valve member 42 will remain closed when the end plate 38 moves away from the end of the valve stem 40. With the above arrangement, the dump valve assembly will not dump as long as line pressure is greater than 10 p.s.i. even though below freezing temperature conditions exist. For instance, assuming that line pressure exceeds 10 p.s.i. and the bellows chamber 60 is subject to a temperature condition of below 32° F., the valve member 42 will remain seated by line pressure because the biasing force of the spring 56 is not sufficient to move the valve stem 40 and valve member 42 against the force of the line pressure.

Assuming now that the line pressure is at 10 p.s.i. or below, the line pressure force on the valve member 42 is less than the biasing force of the coil spring 56. Thus, the valve member 42 will be opened or closed depending upon the resultant force thereon determined by the bellows force acting on the end of the valve stem 40 and the spring force acting on the snap ring 54. With such an arrangement, the valve member 42 will be opened or closed in response to temperature as long as the line pressure is at 10 p.s.i. or below. For instance, at high temperatures, the fluid in bellows chamber 60 causes contraction of the bellows 36 so that its end plate 38 maintains a bellows force on the end of the valve stem 40 that is greater than the opposing spring force whereby the valve member 42 remains closed on the valve seat 18.

When the temperature drops to 40–42° F., the bellows 36 is expanded and the spring force begins to exceed the bellows force whereby the valve member 42 starts to open. As the temperature continues to drop the bellows 36 is further expanded until at a temperature of 33° F., the valve member 42 is opened a minimum amount and the assembly dumps the fluid in the line. In the event the temperature should again increase, the valve member 42 will be again closed automatically without the necessity of replacement or a resetting operation.

When the valve member 42 is opened in response to low temperatures and the line is dumped to prevent damage from freezing, it is also possible that the pressure in the line may be increased by some remote agency. Under such circumstances, as soon as the line pressure exceeds 10 p.s.i., the line pressure force acting on the valve member 42 is greater than the spring force so that the valve member 42 will be closed. It is now obvious that the dump valve assembly may be automatically returned to a closed position by increasing the line pressure above 10 p.s.i. even though the temperature is below freezing.

In the event the thermally responsive bellows 36 should fail, there will be no bellows force on the valve element 42 which, consequently, will continue to respond to line pressure only. A failsafe arrangement is thus achieved in that should the line pressure drop below 10 p.s.i., the valve element 42 will dump regardless of temperature; furthermore, even though the bellows is faulty, the valve element 42 will automatically close should the line pressure be restored to above 10 p.s.i.

While the preferred embodiment is designed to operate at a temperature of 33° F. and a line pressure of 10 p.s.i., other temperature and/or pressure conditions may be utilized as by varying the effective area of the valve and by adjusting the biasing force of the coil spring.

Inasmuch as the present invention is subject to many modifications and changes in details, it is intended that all matter contained in the foregoing description of the preferred embodiment or shown on the accompanying drawing shall be interpreted as illustrative and not in a limiting sense.

What is claimed is:
1. In a fluid line conducting a fluid under pressure, a dump valve adapted to drain the fluid therefrom for freeze protection comprising a valve body having a fluid chamber receiving the fluid in said line,
drain port means for said chamber,
valve means controlling said drain port means,
biasing means exerting a biasing force on said valve means to move the same to an open position,
temperature responsive bellows means responsive to ambient temperature variations exterior of said fluid chamber and exerting a bellows force on said valve means in opposition to said biasing force,
said bellows force being variable in response to ambient temperature variations and being lesser than said biasing force when ambient temperature is below a predetermined value, and being greater than said biasing force to maintain said valve means in a closed position when ambient temperature is above the predetermined value,
means defining a pressure responsive area on said valve means exposed to the fluid in said chamber so that a pressure force is exerted on said valve means in opposition to said biasing force,
said pressure force being variable in response to line pressure variations and being greater than said biasing force when line pressure is above a predetermined pressure to maintain said valve means in its closed position independently of ambient temperature variations, and being lesser than said biasing force when line pressure is below the predetermined pressure, said biasing force being sufficient to open said valve against said bellows and pressure forces when said ambient temperature and line pressure are both below their respective predetermined values.

2. The invention as recited in claim 1 wherein said bellows means comprises a bellows housing fixed to said valve body and a bellows in said housing defining with said housing and said body first and second bellows chambers, respectively, a thermally responsive fluid sealed in said first chamber for expanding and contracting said bellows in response to ambient temperature variations, said second bellows chamber being in communication with said fluid chamber, said bellows being contracted in response to ambient temperature increases and being normally expandable whereby failure of said bellows removes said bellows force from said valve means.

3. The invention as recited in claim 2 wherein said valve means includes a valve member in said fluid chamber and a valve stem, said valve member being fixed to one end of said valve stem, said valve stem having an opposite end extending through said second bellows chamber for engagement by said bellows.

4. The invention as recited in claim 3 wherein said biasing means comprises spring means acting on said valve stem and spring retainer means fixed in the chamber of said valve body and engaging said valve stem for guiding the movement thereof.

5. The invention is recited in claim 4 wherein said valve stem includes an adjustably positioned ring member and said spring means includes a coil spring encircling said valve stem and mounted in compression between said spring retainer means and said ring member.

References Cited by the Examiner
UNITED STATES PATENTS

| | | | |
|---|---|---|---|
| 1,091,660 | 3/1914 | Hornung | 236—92 |
| 2,785,861 | 3/1957 | Kimm et al. | 236—92 |
| 2,804,758 | 9/1957 | Smith et al. | 137—62 X |
| 2,917,077 | 12/1959 | Ziege | 137—517 X |
| 3,081,034 | 3/1963 | Schumann | 236—93 |

FOREIGN PATENTS 601,792   12/1925   France.

WILLIAM F. O'DEA, *Primary Examiner.*

R. GERARD, *Assistant Examiner.*